United States Patent
Zwart et al.

(10) Patent No.: US 7,681,227 B2
(45) Date of Patent: Mar. 16, 2010

(54) GENERATION OF ENCRYPTED VIDEO INFORMATION

(75) Inventors: Sjoerd Zwart, Eindhoven (NL); Pieter-Jelle Gerbrandts, Eindhoven (NL); Tom Kan, Eindhoven (NL)

(73) Assignee: IPG Electronics 503 Limited, St. Peter Port, Guernsey (GB)

( * ) Notice: Subject to any disclaimer, the term of this patent is extended or adjusted under 35 U.S.C. 154(b) by 1253 days.

(21) Appl. No.: 10/544,773

(22) PCT Filed: Jan. 20, 2004

(86) PCT No.: PCT/IB2004/050039
§ 371 (c)(1),
(2), (4) Date: Aug. 5, 2005

(87) PCT Pub. No.: WO2004/071091
PCT Pub. Date: Aug. 19, 2004

(65) Prior Publication Data
US 2006/0188094 A1 Aug. 24, 2006

(30) Foreign Application Priority Data
Feb. 10, 2003 (EP) .................... 03100264

(51) Int. Cl.
*H04L 9/00* (2006.01)
(52) U.S. Cl. .......................... 726/2; 380/200
(58) Field of Classification Search .......... 726/2, 726/5, 18, 19, 27; 713/179, 189, 193; 380/1, 380/200–201, 212, 239, 259, 37, 42, 28–30, 380/281–285; 705/51, 57, 25, 105; 382/232; 386/35, 40; 725/25, 62–64, 74, 82–91, 101–105
See application file for complete search history.

(56) References Cited

U.S. PATENT DOCUMENTS

| | | | | |
|---|---|---|---|---|
| 4,131,762 A * | 12/1978 | Reid | .......................... | 370/370 |
| 5,920,572 A * | 7/1999 | Washington et al. | ........ | 370/535 |
| 6,148,082 A * | 11/2000 | Slattery et al. | .............. | 380/212 |
| 7,149,811 B2 * | 12/2006 | Wise et al. | ................... | 709/247 |
| 7,333,610 B2 * | 2/2008 | Dallard et al. | .............. | 380/239 |
| 7,369,662 B2 * | 5/2008 | Relander et al. | ............ | 380/261 |
| 7,486,793 B2 * | 2/2009 | Cochard et al. | ............. | 380/231 |
| 2002/0116705 A1 | 8/2002 | Perlman et al. | | |

FOREIGN PATENT DOCUMENTS

| | | | |
|---|---|---|---|
| WO | 0178387 A1 | 10/2001 | |
| WO | 03107665 A1 | 12/2003 | |
| WO | 03107666 A1 | 12/2003 | |

OTHER PUBLICATIONS

Functional Model of a Conditional Access System, EBU Tech. No. 266, Dec. 1995, pp. 64-77, XP000559450.

* cited by examiner

*Primary Examiner*—Kimyen Vu
*Assistant Examiner*—Leynna T Truvan
(74) *Attorney, Agent, or Firm*—Volpe And Koenig, P.C.

(57) ABSTRACT

An encrypted stream of video information (20) contains first video frames (22) and second video frames which are accessible and not accessible during trick play respectively. From a source stream encrypted that is for decryption with repeatedly changing control words sections of the stream are identified where respective first ones of the frames occur in the stream. Control words for decryption (24) are included in the stream. At least part of the control words are included in the stream at positions selected synchronized to the identified sections.

10 Claims, 1 Drawing Sheet

GENERATION OF ENCRYPTED VIDEO INFORMATION

Figure 1:
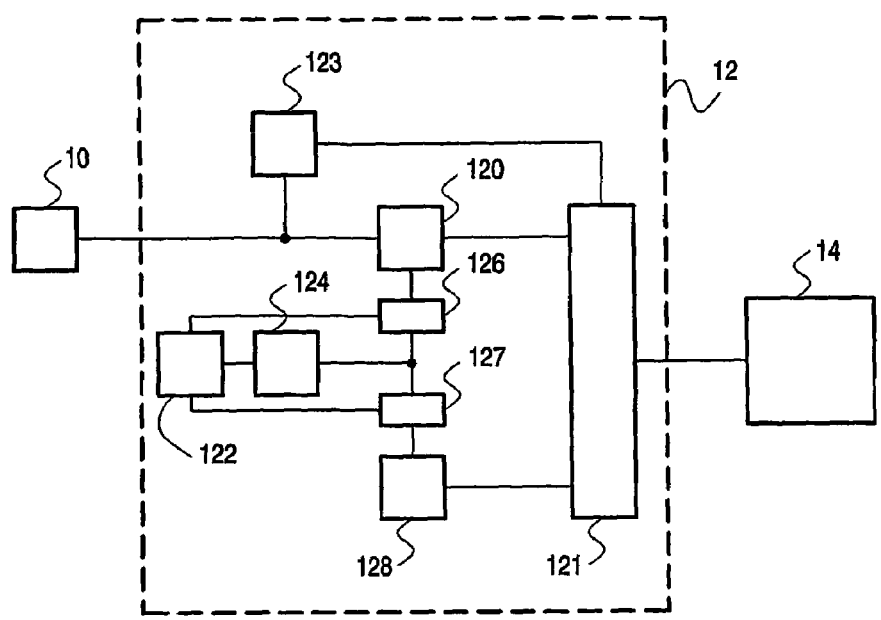

The invention relates to a method and apparatus for generating an encrypted stream of video information.

PCT patent application No. 01/78387 describes a method of storing conditional access data. For conditional access purposes video information is encrypted. The control word needed for decryption changes regularly, typically every few seconds, so as to limit the damage when an authorized user gets hold of a control word. Thus, the stream is subdivided into successive time intervals, called crypto-periods, in which successively different control words are needed.

The changing control words are supplied in the packets in stream as so-called ECM's. The ECM's themselves are encrypted with a stronger form of encryption than the video data ECM's are supplied approximately every tenth of a second to minimize the delay before decryption can commence after switching to a stream. Generally each ECM contains two control words: the control word needed for the current crypto-period during which the ECM occurs in the stream and the control word for the next crypto-period. Thus, the "next" control word is transmitted early to allow for the time needed to decrypt it from the ECM.

This way of supplying control words may give rise to difficulties when the stream is accessed in an abnormal way, such as during trick play (fast forward play, reverse play etc.). In this case, generally only part of the stream is accessed. Typically only so-called frames are accessed, that is, frames of video information in which an image has been compressed so that the image can be decompressed without reference to other images. Other frames, so-called P and B frames, which are compressed as updates to adjacent frames are not accessed in this case. As a result only part of the stream is accessed. This may disrupt the normal regular supply of ECM's and thereby access to the control words. Moreover, during reverse play, the required "next" control word is not available from the ECM's because the "next" control word in the ECM's assumes forward play.

Various solutions have been proposed to address these problems. WO01/78387 proposes supplying three control words per ECM: a current control word, a next future control word and a next past control word. Another solution has been to make use of a special storage structure for storing a video stream, so that ECM's can be retrieved independently of access to the video information from the stream. However, these solutions all require additional information that is not provided for in standard streams.

Among others it is an object of the invention to support abnormal access, and in particular trick play access, to encrypted video streams without using more than the standard information in a stream.

The method of generating a stream according to the invention is set forth in Claim 1. According to the invention the occurrence of items of decryption information, and in particular ECM's in a video stream is synchronized to sections of the stream that contain selected frames, preferably frames that have been encoded so that they can be decoded (if need be decompressed) without reference to other frames.

According to another aspect of the invention the change of the control words included in items of decryption information the stream is synchronized to the crypto periods so that the change occurs substantially midway crypto periods. Thus, in the first half of the crypto period the current control word and the next past control word are included in the items and in the second half the current control word and the next future control word are included. As a result both in forward play and reverse play the next required control word is available for substantially the same amount of time, permitting the same, maximum play speed both in forward and reverse direction. "Substantially" should be taken broadly in this case: already when the change of control word occurs between one quarter and three quarters of the crypto period a significant improvement occurs over changing the control word substantially at the border of the crypto periods. Placing the transition exactly halfway optimizes maximum speed both in forward and reverse direction.

These and other objects and advantageous aspects of the invention will be described in more detail using the following figures.

Figure 2:
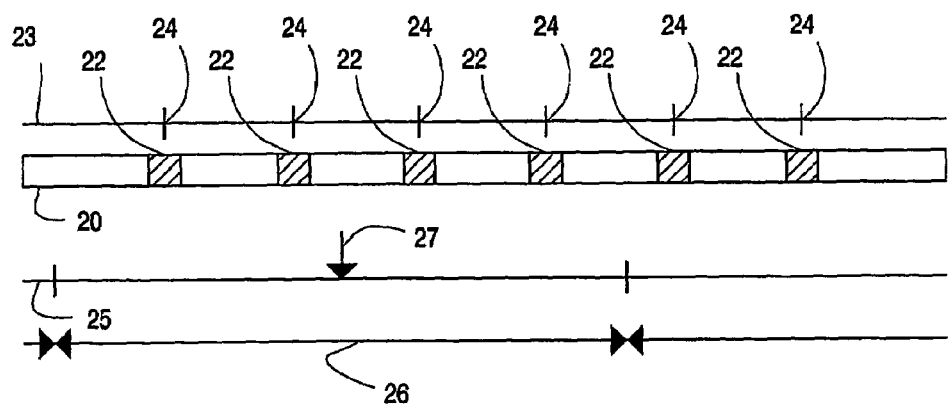

FIG. 1 shows a conditional access system;
FIG. 2 shows a conditional access stream.

FIG. 1 schematically shows a conditional access system. The system contains a source 10, an encrypted stream generating unit 12 and a receiver 14. The figure shows various components of encrypted stream generating unit 12 in more detail. It should be understood that encrypted stream generating unit 12 may be implemented as a suitably programmed computer, in which the components correspond to software elements, or as a set of cooperating hardware units, in which case the components correspond to different hardware elements, or combinations of programmed units and suitable hardware.

Encrypted stream generating unit 12 contains a time interval selection unit 122, a key generator 124, key memories 126, 127, an encryption unit 120, an ECM generator 128, a multiplexer 121 and an ECM inclusion control unit 123. Source 10 has a stream packet output coupled to an input of encryption unit 120, which has an output coupled to a first input of multiplexer 121. A second input of multiplexer 121 is coupled to ECM generator 128. Multiplexer 121 has an output coupled to receiver 14. Key generator 124 has an output coupled to key memories 126, 127, which in turn have outputs coupled to encryption unit 120 and ECM generator 128 respectively. Time interval selection unit 122 has outputs coupled to key generator 124 and key memories 126, 127. ECM inclusion control unit 123 has an input coupled to the output of source 10 and multiplexer 121.

FIG. 2 symbolically shows a stream of encrypted video information 20. Stream 20 contains sections 22, indicated as shaded blocks in which packets with information describing I-frames are included. Along stream 20 a first time-line 23 has been drawn to indicate a number of time points where ECM's are included in stream 20. ECM's are included at least at time points 24 during sections 22. An ECM is an item of decryption information that generally contains a pair of control words which themselves have been encrypted. A further time-line 25 has been drawn to indicate a crypto period 26 and a point in time 27 where the content of an ECM changes midway crypto period 26. (It should be noted that, for the sake of clarity, crypto period 26 has not been drawn to scale with sections 22 (I-frames). In practice crypto period 26 will extend over many more I-frames).

In operation source 10 produces a stream of packets of compressed but as yet unencrypted video information. Encryption unit encrypts the packets and passes them to multiplexer 121. Multiplexer 121 passes all encrypted packets. At selected time-points 24 multiplexer 121 passes an ECM from ECM generator 128 between the packets of video information. The time points are selected by ECM inclusion control unit 123.

ECM inclusion control unit 123 detects the occurrence of sections 22 in which packets describing an I-frame are included in stream 20 (i.e. sections that start with the first packet describing an I-frame and end with the last packet that describes that I-frame) and ensures that during each section 22 a time point 24 occurs at which an ECM is included in the stream. Generally ECM inclusion control unit 123 signals multiplexer 121 to include ECM's in the stream also outside sections 22 for the I-frames occur. More than one ECM may occur even in a section 22. In fact the majority of ECM's may be included outside these sections 22, dependent for example on the maximum allowable delay between successive ECM's. Nevertheless, even if the maximum allowable delay does not call for inclusion of an ECM, ECM inclusion control unit 123 ensures that at least one ECM occurs in every section 22. It should be noted that multiplexer 121 does not generally serve replace encrypted video information by ECM's. It will be appreciated that encryption unit 120 may hold up output of an encrypted packet while an ECM is inserted.

The stream is fed to receiver 14. Receiver may process the stream in any way. The most straightforward use of the stream is live play in which a program from the stream is decrypted as the stream comes in and all frames (both I frames and P and B frames) are processed. In this case the location of ECM's in sections 22 has no special effect. As an alternative, receiver 14 may store stream 20 in a storage device, for example a magnetic disk, for later use. In this case the stream may be played from the disk in a trick play mode, for example by accessing only I-frames, in the sequence in which they occur in the stream. This results in fast forward. Reverse play may be realized by accessing I frames, i.e. sections 22, in the reverse of the sequence with which they occur in the stream (the sections 22 internally being accessed in normal sequence).

As a result of the location of ECM's in each section 22 it is ensured that the encrypted stream can readily be accessed during abnormal access in which only selected sections 22 of the stream are accessed. Because each section has been made to contain at least one ECM, it is ensured that at least one ECM will be read per I-frame when the I frames are accessed selectively. Although the invention has been described using ECM's in sections 22, it will be appreciated that the invention applies as well to forms of conditional access that do not uses ECM's, e.g. when control words are included with other packets. Similarly it will be appreciated that it is possible to include the ECM's outside sections 22 (which each run from the packet with the start of an I-frame to the packet with the end of that I-frame) but within a fixed timing relation with the packets (e.g. just before the start or just behind the end), provided that it is ensured that, when receiver 14 accesses sections, it also access the part of the stream in that is within this fixed timing relation.

Also similarly, it should be appreciated that the invention is not limited to sections 22 with MPEG I-frames. The invention may be applied to any type of compression where selected images are encoded by themselves, like I frames, and other images are encoded as updates. In fact the invention may be applied to any form of compression in which sections 22 can be identified that can be decompressed without reference to their surroundings, when it is known that these sections 22 will be read selectively during trick mode play. The sections may contain for example pairs of images that can be decoded without outside reference, or video information outside the sections may be decodable without reference to the sections, but not accessed during trick mode play.

Furthermore, it will be appreciated that source 10 may be partly or wholly included in encrypted stream generating unit 12. For example, in different embodiments, analog video information or uncompressed digital information, or compressed but not yet packetized video information may be supplied to encrypted stream generating unit 12, for conversion into a packetized, compressed and encrypted stream, with items of decryption information (e.g. ECM's) synchronized with sections 22. Also, it should be appreciated that stream generating unit 12 may in fact be implemented using a programmable computer that is programmed with program parts for performing the function of the various elements shown in FIG. 1. Also any mix of program implemented functions and hardware implemented functions may be used. Instead of generating the stream "live" it may be created by writing the content of the stream into a memory device (not shown) and by defining the sequence in which the stream must be read from the memory device.

Instead of a multiplexer 121 any other implementation of insertion may be used, for example a memory device may be provided from which the stream is read sequentially for transmission to receiver 14. In this case, packets of video data and packets with ECM's are written into the memory device, for later reading. Many alternative implementations for insertion are possible in this case. Insertion may be realized for example by reserving memory space between successive packets of video information at positions selected by inclusion control unit 123, and inserting the ECM's in the reserved space. As an alternative an access table with pointers to successive parts of the stream may used, locations for access pointers being reserved at locations selected by inclusion control unit 123, where pointers to the ECM's are inserted. As an other alternative insertion may be realized using chained pointers to packets and opening of the chain to insert a pointer to an ECM.

In another embodiment encryption unit 120 may be part of source 10. In this case encrypted stream generating unit 12 merely detects sections 22 in stream 20, for example by decrypting packets from the stream and testing whether these packets contain information about I-frames, so as to determine where sections 22 occur in the stream. In this case an ECM that occurs in the stream near each detected section 22 is added to the stream in the section 22 (or in predetermined timing relation to it), at least if the section does not already contain an ECM. Optionally the original ECM is deleted from the stream so as to leave the size of the stream unaffected (or alternatively a newly generated ECM is used, with control words corresponding to the current crypto period 26 and an adjacent crypto period).

Time interval selection unit 122 defines the crypto period. At the start of each next crypto period time interval selection unit 122 causes first key memory 126 to start supplying the next key from key generator 124. Subsequently time interval selection unit 122 causes key generator 124 to produce a new key.

At a time point 27 substantially midway the crypto period 26 time interval selection unit 122 causes second key memory 127 to replace the least recently generated key in second key memory 127 by the new key. ECM generator 128 generally includes two keys in each ECM, identified as the even control word and the odd control word respectively. In alternate crypto periods 26, the even control and the odd control word must be used to decrypt video information respectively. Encryption unit 120 includes information whether the even control word or the odd control word should be used. Substantially midway each particular crypto period one of the even and odd control words is replaced by the new key, specifically that control word (even or odd) that is not used in the particular crypto period. Thus ECM's from time point 27 substantially midway crypto period 26 start containing the control word for the next subsequent crypto period.

The result is that during reverse play access the control word needed for the next crypto period to be played (the past crypto period under forward play conditions) is available when I frames from at least half the current crypto period 26 still have to be accessed. (It should be remembered that crypto period 26 generally extends over many more I-frames than shown in FIG. 2). Similarly during forward play access the control word for the next crypto period to be played is available when I frames from at least half the current crypto period 26 still have to be accessed. Fast play compresses the time interval from the time point at which the new control word is supplied to the start of the next crypto period (that is, the time point where the new control word is first needed). During this compressed time interval the new control word has to be extracted (decrypted) from the ECM the minimum time needed to do so limits the maximum possible play speed. By locating time point 27 where the control word is changed midway crypto period 26 the smallest of the play speeds for forward and reverse play is maximized. It will be realized that this advantage is also realized when the new control word starts to be supplied from a point in time 27 that is not exactly halfway crypto period 26. However the maximum allowable play speed decreases as time point 27 is moved. When time point 27 is between one quarter or three quarters of the way in crypto period 26 the maximum allowable fast play speed is less than halved for one of forward and reverse play. Less extreme locations lead to less speed reduction. A time point at 10% of crypto period or less from halfway crypto period 26 leads to less than 20% speed reduction.

In another embodiment source 10 generates the ECM's and encrypted stream generating unit 12 merely moves the ECM's so that the change of ECM occurs at the required time point 27. That is, if ECM's from source 10 before time point 27 contain future control words, encrypted stream generating unit 12 replaces these ECM's by older ECM's that contain the control word for the current crypto period 26 and a future. Similarly, if ECM's from source 10 after time point 27 contain past control words, encrypted stream generating unit 12 replaces these ECM's by older ECM's that contain the control word for the current crypto period 26 and a past crypto period. Of course, dependent on the speed with which source changes control words only one of these types of replacement may need to be provided for.

For this purpose, a memory is provided for old ECM's and/or a delay may be provided for delaying the stream by a time interval so that time point 27 occurs in the delayed stream when a new control word for the future crypto period is available. In a different embodiment, stream 20 may be stored in its entirety on a storage medium (not shown) before replay, or at least a long duration from the stream of, say, at least 10 minutes may be stored. In this case encrypted stream generating unit 12 may replace the ECM's in the storage medium.

The invention claimed is:

1. A method of generating an encrypted stream of video information that represents video frames, the video frames comprising a plurality of first video frames accessible during a special mode of play and a plurality of second video frames not accessible during a special mode of play, the method comprising:

encrypting the video information to produce an encrypted stream for decryption with control words, the stream of encrypted video information being divided into successive crypto-periods, each of the successive crypto-periods requiring a respective control word for decryption of the encrypted stream of video information: identifying a plurality of sections of the source stream of video information that represent the plurality of first video frames;

providing items of decryption information each comprising a first control word and a second control word for decryption of the encrypted stream of video information; and inserting items of decryption information into the encrypted stream in each of the plurality of successive crypto-periods, at least some of the items of decryption information being inserted into the encrypted stream of video information at times synchronized to first video frames, wherein:

the first control word is configured to decrypt the encrypted stream during a current crypto-period that is the crypto-period in which the decryption information is inserted;

the second control word is configured to decrypt the encrypted stream during another one of the plurality of crypto-periods;

for the items of decryption information located substantially in a first half of a crypto-period, the second control word is configured to decrypt the encrypted stream during the crypto-period that precedes the crypto-period in which the decryption information is inserted thereby providing the next past control word required for reverse play; and for items of decryption information located substantially in a second half of a crypto-period, the second code word is configured to decrypt the encrypted video stream during the crypto-period that follows the crypto-period in which the decryption information is inserted thereby providing the next future control word required for forward play.

2. The method according to claim 1 further comprising:

selecting the plurality of first video frames based on a detection of video frames that are decodable without reference to other video frames; and inserting the items of decryption information into a position within the one of the plurality of successive crypto-periods such that the position is synchronized to the plurality of sections, wherein each of the plurality of sections start and end with information from one of the plurality of first video frames.

3. The method according to claim 2 further comprising inserting a respective item of decryption information in each of the plurality of sections.

4. A method of generating an encrypted stream of video information that represents video frames, the video frames comprising a plurality of first video frames accessible during a special mode of play and a plurality of second video frames not accessible during a special mode of play, the method comprising:

encrypting the video information to produce an encrypted stream for decryption with control words, the stream of encrypted video information being divided into successive crypto-periods, each of the successive crypto-periods requiring a respective control word for decryption of the encrypted stream of video information;

identifying a plurality of sections of the source stream of video information that represent the plurality of first video frames;

providing items of decryption information each comprising a first control word and a second control word for decryption of the encrypted stream of video information; and inserting items of decryption information into the encrypted stream in each of the plurality of successive crypto-periods, at least some of the items of decryption information being inserted into the encrypted stream of video information at times synchronized to first video frames, wherein:

the first control word is configured to decrypt the encrypted stream during a current crypto-period that is the crypto-period in which the decryption information is inserted;

the second control word is configured to decrypt the encrypted stream during another one of the plurality of crypto-periods;

for the items of decryption information located substantially in a first half of a crypto-period, the second control word is configured to decrypt the encrypted stream during the crypto-period that precedes the crypto-period in which the decryption information is inserted thereby providing the next past control word required for reverse play;

for items of decryption information located substantially in a second half of a crypto-period, the second code word is configured to decrypt the encrypted video stream during the crypto-period that follows the crypto-period in which the decryption information is inserted thereby providing the next future control word required for forward play;

storing the encrypted stream; and selectively retrieving parts of the encrypted stream in a trick play mode, including the plurality of sections.

5. A storage medium configured to store an encrypted stream of video information representing video frames, the encrypted stream of video information comprising:

a plurality of sections comprising a plurality of first video frames accessible during a special mode of play; a plurality of second video frames not accessible during a special mode of play;

the encrypted stream being encrypted for decryption with control words;

the stream of encrypted video information being divided into successive crypto-periods, each of the successive crypto-periods requiring a respective control word for decryption of the encrypted stream; and the encrypted stream also comprising items of decryption information each comprising a first control word and a second control word, wherein:

the items of decryption information are inserted into the encrypted stream in each of the plurality of successive crypto-periods;

at least some of the items of decryption information being inserted into the encrypted stream of video information at times synchronized to first video frames;

the first control word is configured to decrypt the encrypted stream during a current crypto-period that is the crypto-period in which the decryption information is inserted;

the second control word is configured to decrypt the encrypted stream during another one of the plurality of crypto-periods;

for the items of decryption information located substantially in a first half of a crypto-period, the second control word is configured to decrypt the encrypted stream during the crypto-period that precedes the crypto-period in which the decryption information is inserted thereby providing the next past control word required for reverse play; and for items of decryption information located substantially in a second half of a crypto-period, the second code word is configured to decrypt the encrypted video stream during the crypto-period that follows the crypto-period in which the decryption information is inserted thereby providing the next future control word required for forward play.

6. The encrypted stream according to claim 5, further comprising an item of decryption in each of the plurality of sections.

7. Dallard discloses an apparatus for generating an encrypted stream of video information, the stream of video information representing a plurality of first video frames accessible during a special mode of play and a plurality of second video frames not accessible during a special mode of play, the apparatus comprising:

a video source unit configured to provide a source stream of video information;

an encryption unit to encrypt the source stream to produce an encrypted stream for decryption with control words, the stream of encrypted video information being divided into successive crypto-periods, each of the successive crypto-periods requiring a respective control word for decryption of the encrypted stream of video information;

a section identification unit configured to identify a plurality of sections of the source stream of video information including the plurality of first video frames;

a control word generator configured to provide items of decryption information each comprising a first control word and a second control word for decryption of the encoded video stream; and an insertion unit configured to insert the items of decryption information into each of the plurality of successive crypto-periods, wherein:

the first control word is configured to decrypt the encrypted stream during a current crypto-period that is the crypto-period in which the decryption information is inserted;

the second control word is configured to decrypt the encrypted stream during another one of the plurality of crypto-periods;

for the items of decryption information located substantially in a first half of a crypto-period, the second control word is configured to decrypt the encrypted stream during the crypto-period that precedes the crypto-period in which the decryption information is inserted thereby providing the next past control word required for reverse play; and for items of decryption information located substantially in a second half of a crypto-period, the second code word is configured to decrypt the encrypted video stream during the crypto-period that follows the crypto-period in which the decryption information is inserted thereby providing the next future control word required for forward play.

8. The apparatus according to claim 7 wherein the selection identification unit is further configured to select the plurality of first video frames based on a detection of video frames that are decodable without reference to other video frames, and the insertion unit is further configured to insert the items of decryption information into a position within the successive crypto-periods such that the position is synchronized to the plurality of sections, wherein each of the plurality of sections start and end with information from one of the plurality of first video frames.

9. The apparatus according to claim 8 wherein the insertion unit is further configured to insert a respective item of decryption information in each of the plurality of sections.

10. A computer readable medium configured to store an encrypted stream of video information representing video frames, the encrypted stream of video information comprising:

a plurality of sections comprising a plurality of first video frames accessible during a special mode of play;

a plurality of second video frames not accessible during a special mode of play;

the encrypted stream being encrypted for decryption with control words;

the stream of encrypted video information being divided into successive crypto-periods, each of the successive crypto-periods requiring a respective control word for decryption of the encrypted stream; and the encrypted stream also comprising items of decryption information each comprising a first control word and a second control word, wherein:

the items of decryption information are inserted into the encrypted stream in each of the plurality of successive crypto-periods;

at least some of the items of decryption information being inserted into the encrypted stream of video information at times synchronized to first video frames;

the first control word is configured to decrypt the encrypted stream during a current crypto-period that is the crypto-period in which the decryption information is inserted;

the second control word is configured to decrypt the encrypted stream during another one of the plurality of crypto-periods;

for the items of decryption information located substantially in a first half of a crypto-period, the second control word is configured to decrypt the encrypted stream during the crypto-period that precedes the crypto-period in which the decryption information is inserted thereby providing the next past control word required for reverse play; and for items of decryption information located substantially in a second half of a crypto-period, the second code word is configured to decrypt the encrypted video stream during the crypto-period that follows the crypto-period in which the decryption information is inserted thereby providing the next future control word required for forward play.

* * * * *

UNITED STATES PATENT AND TRADEMARK OFFICE
CERTIFICATE OF CORRECTION

PATENT NO. : 7,681,227 B2
APPLICATION NO. : 10/544773
DATED : March 16, 2010
INVENTOR(S) : Zwart et al.

It is certified that error appears in the above-identified patent and that said Letters Patent is hereby corrected as shown below:

IN THE CLAIMS

Column 8, Line 8, Claim 7, delete "Dallard discloses an", and insert therefore, --An--.

Signed and Sealed this

First Day of June, 2010

David J. Kappos
*Director of the United States Patent and Trademark Office*